(12) United States Patent
Lopez et al.

(10) Patent No.: US 10,544,679 B2
(45) Date of Patent: Jan. 28, 2020

(54) TURBINE ENGINE BALANCING STRUCTURE AND METHOD

(71) Applicant: United Technologies Corporation, Farmington, CT (US)

(72) Inventors: Jesus S. Lopez, Royal Palm Beach, FL (US); Mark Borja, Palm Beach Gardens, FL (US)

(73) Assignee: United Technologies Corporation, Farmington, CT (US)

( * ) Notice: Subject to any disclaimer, the term of this patent is extended or adjusted under 35 U.S.C. 154(b) by 628 days.

(21) Appl. No.: 15/111,364

(22) PCT Filed: Jan. 9, 2015

(86) PCT No.: PCT/US2015/010728
§ 371 (c)(1),
(2) Date: Jul. 13, 2016

(87) PCT Pub. No.: WO2015/112344
PCT Pub. Date: Jul. 30, 2015

(65) Prior Publication Data
US 2016/0326876 A1    Nov. 10, 2016

Related U.S. Application Data

(60) Provisional application No. 61/929,689, filed on Jan. 21, 2014.

(51) Int. Cl.
*F01D 5/02* (2006.01)
*F16F 15/32* (2006.01)
(Continued)

(52) U.S. Cl.
CPC .......... *F01D 5/027* (2013.01); *F04D 29/662* (2013.01); *F16F 15/322* (2013.01); *G01M 1/32* (2013.01);
(Continued)

(58) Field of Classification Search
CPC ... F01D 5/10; F01D 5/26; F01D 25/04; F04D 29/662; F05D 2220/32; F05D 2260/96;
(Continued)

(56) References Cited

U.S. PATENT DOCUMENTS 4,043,147 A * 8/1977 Wiebe ..................... F01D 5/027
415/104
4,539,864 A * 9/1985 Wiebe ..................... F16F 15/34
464/180
(Continued)

FOREIGN PATENT DOCUMENTS

DE      102005053786    5/2007
EP      1878871         1/2008
(Continued)

OTHER PUBLICATIONS

The International Search Report and Written Opinion for PCT Application No. PCT/US2015/010728, dated Apr. 28, 2015.
(Continued)

*Primary Examiner* — Brian P Wolcott
(74) *Attorney, Agent, or Firm* — Carlson, Gaskey & Olds, P.C.

(57) ABSTRACT

An example method of balancing a shaft includes inserting a balancing insert into one of a plurality of cavities. The plurality of cavities are radially inside an outermost surface of the shaft.

20 Claims, 6 Drawing Sheets

(51) Int. Cl.
*F04D 29/66* (2006.01)
*G01M 1/32* (2006.01)

(52) U.S. Cl.
CPC ...... *F05D 2220/32* (2013.01); *F05D 2240/60* (2013.01); *F05D 2240/61* (2013.01); *Y02T 50/671* (2013.01)

(58) Field of Classification Search
CPC .......... F16F 15/32; F16F 15/322; F16F 15/34; G01M 1/32
USPC .............................................. 74/572.4, 574.4
See application file for complete search history.

(56) References Cited

U.S. PATENT DOCUMENTS

| | | | |
|---|---|---|---|
| 4,976,585 A | 12/1990 | Mezzedimi et al. | |
| 5,205,189 A * | 4/1993 | Wesling | F01D 5/027 464/180 |
| 5,810,527 A | 9/1998 | Jager et al. | |
| 6,477,916 B2 | 11/2002 | Knorowski et al. | |
| 7,303,377 B2 * | 12/2007 | Rockarts | F01D 5/027 416/144 |
| 7,371,042 B2 | 5/2008 | Lee | |
| 8,246,305 B2 * | 8/2012 | Lecuyer | F01D 5/027 416/95 |
| 8,303,255 B2 * | 11/2012 | Ramlogan | G01M 1/36 416/144 |
| 8,668,457 B2 * | 3/2014 | Juh | F01D 5/027 416/145 |
| 9,200,977 B2 * | 12/2015 | Casadio | F01D 5/027 |
| 9,556,929 B2 * | 1/2017 | Hopkins | B64D 41/007 |
| 2005/0244272 A1 | 11/2005 | Bruno et al. | |
| 2006/0188379 A1 | 8/2006 | Rockarts et al. | |
| 2011/0081253 A1 | 4/2011 | Lecuyer et al. | |
| 2012/0107095 A1 | 5/2012 | Juh | |

FOREIGN PATENT DOCUMENTS

| | | |
|---|---|---|
| EP | 2520767 | 11/2012 |
| GB | 2454569 | 5/2009 |
| WO | 2011070100 | 6/2011 |

OTHER PUBLICATIONS

International Preliminary Report on Patentability for Application No. PCT/YS2015/010728 dated Aug. 4, 2016.
Supplementary European Search Report for Application No. 15741071.3 dated Oct. 27, 2017.

* cited by examiner ial and propulsive gas turbine engines may both require balancing. Balancing takes place before operation and at service intervals. Detail balancing balances individual gas turbine engine components. Trim balancing balances the gas turbine engine overall.

TURBINE ENGINE BALANCING STRUCTURE AND METHOD

CROSS-REFERENCE TO RELATED APPLICATION

This application claims priority to U.S. Provisional Application No. 61/929,689 filed on Jan. 21, 2014.

BACKGROUND

This disclosure relates to balancing rotatable devices and, more particularly, to turbine engine balancing.

Gas turbine engines typically include a compressor section, a combustor section, and a turbine section. During operation, air is pressurized in the compressor section. The pressurized air is mixed with fuel and burned in the combustor section to generate hot combustion gases. The hot combustion gases are communicated through the turbine section, which extracts energy from the hot combustion gases to power the compressor section and other gas turbine engine loads.

The compressor and turbine sections of a gas turbine engine typically include alternating rows of rotating blades and stationary vanes. The turbine blades rotate and extract energy from the hot combustion gases that are communicated through the gas turbine engine. The turbine vanes prepare the airflow for the next set of blades. The vanes extend from platforms that may be contoured to manipulate flow.

Industrial land-based gas turbine engines and propulsive gas turbine engines may both require balancing. Balancing takes place before operation and at service intervals. Detail balancing balances individual gas turbine engine components. Trim balancing balances the gas turbine engine overall.

SUMMARY

A method of turbine engine balancing according to an exemplary aspect of the present disclosure includes, among other things, inserting a balancing insert into one of a plurality of cavities, the plurality of cavities radially inside an outermost surface of the shaft.

In another example of the foregoing method, the method includes trim balancing a low rotor of a gas turbine engine during the balancing.

In another example of any of the foregoing methods, the gas turbine engine is a land-based gas turbine engine.

In another example of any of the foregoing methods, the cavities are radially outside a central bore of the shaft.

In another example of any of the foregoing methods, the method includes selecting the balancing insert from among a plurality of balancing inserts having varied weights.

In another example of any of the foregoing methods, the method includes holding the balancing insert axially within the cavity using a shaft bore cover.

In another example of any of the foregoing methods, the method includes holding the shaft bore cover axially utilizing a trim ring received within a circumferential groove of the shaft.

In another example of any of the foregoing methods, the method includes accessing the plurality of cavities through an aftmost end of the shaft.

In another example of any of the foregoing methods, the method includes providing the plurality of cavities with the shaft.

In another example of any of the foregoing methods, the method inserting a cartridge into a bore provided by the shaft, the cartridge providing the plurality of cavities.

A gas turbine rotor according to an exemplary aspect of the present disclosure includes, among other things, a balancing insert, and a shaft. A plurality of cavities to selectively receive the balancing insert are positioned radially inside an outermost surface of the shaft.

In another example of any of the foregoing turbine rotors, the shaft is a low rotor shaft of a gas turbine engine.

In another example of any of the foregoing turbine rotors, the gas turbine engine is a land-based gas turbine engine.

In another example of any of the foregoing turbine rotors, the cavity is radially outside a central bore of the shaft.

In another example of any of the foregoing turbine rotors, the balancing insert is one of a plurality of balancing inserts having varied weights.

In another example of any of the foregoing turbine rotors, a shaft bore cover holds the balancing insert axially within the cavity.

In another example of any of the foregoing turbine rotors, the plurality of cavities are distributed annularly about an axis of the shaft.

In another example of any of the foregoing turbine rotors, a trim ring received within a circumferential groove of the shaft to hold the shaft bore cover axially.

In another example of any of the foregoing turbine rotors, the plurality of cavities are accessible through an aftmost end of the shaft.

In another example of any of the foregoing turbine rotors, a cartridge provides the plurality of cavities. The cartridge is insertable into a bore provided by the shaft.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
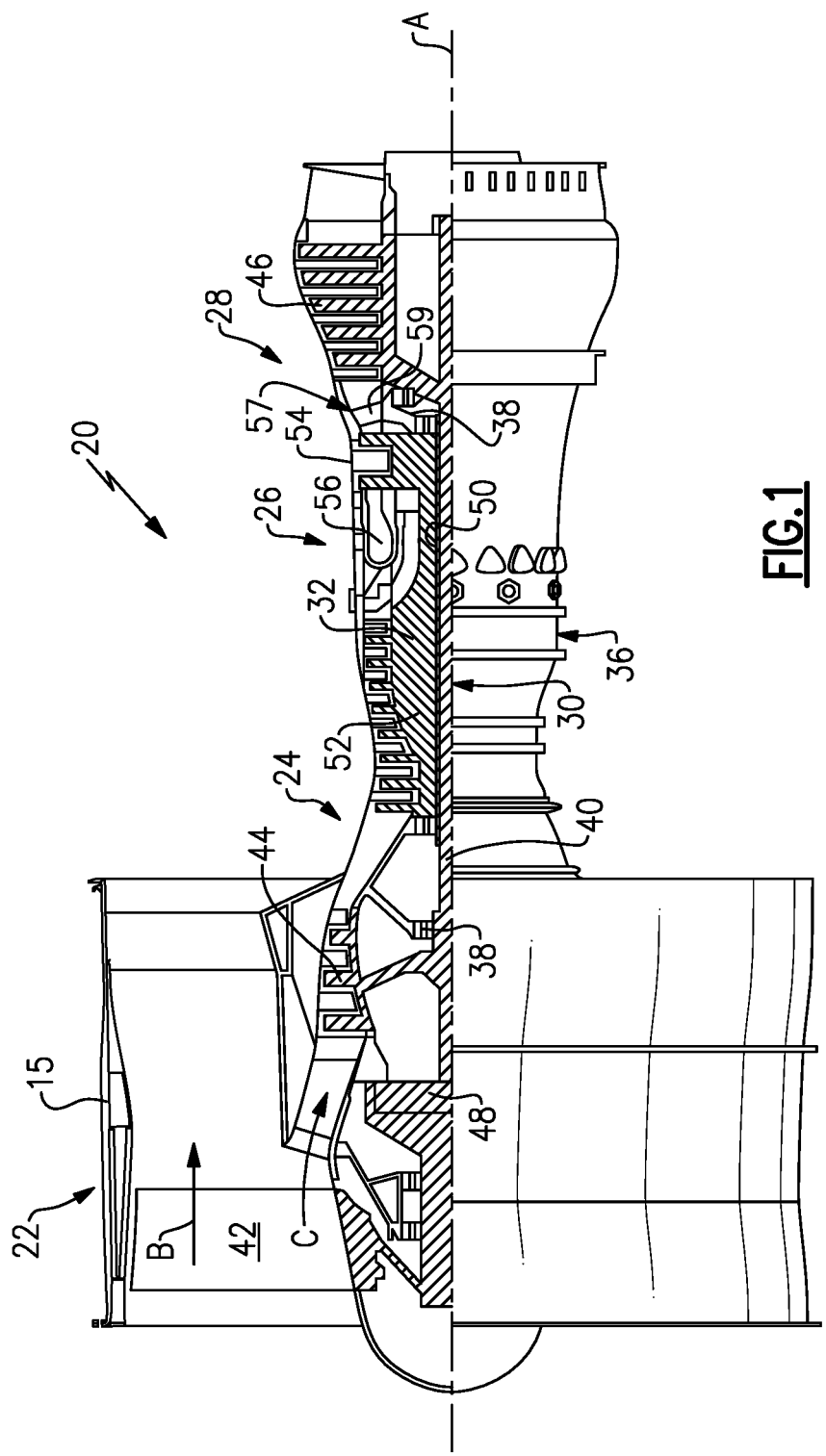
FIG. 1 illustrates a schematic, cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, geared architecture 48 may be located aft of combustor section 26 or even aft of turbine section 28, and fan section 22 may be positioned forward or aft of the location of geared architecture 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2:
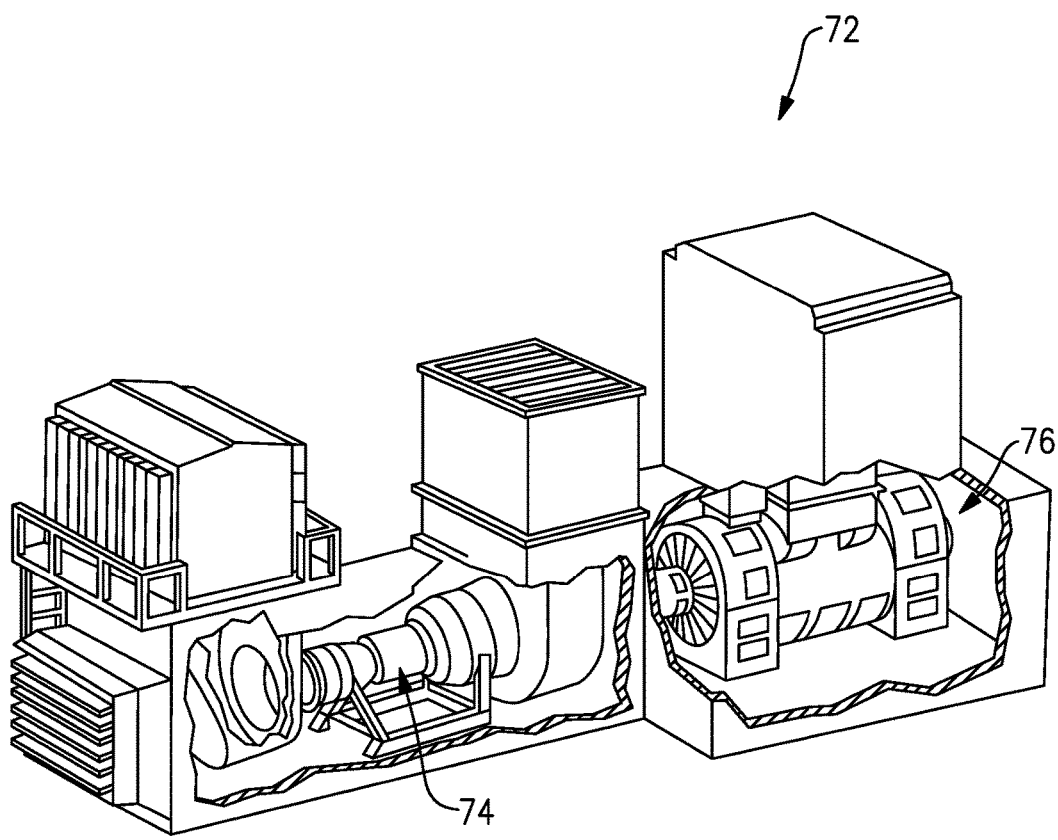
FIG. 2 illustrates another example gas turbine engine.
Figure 3:
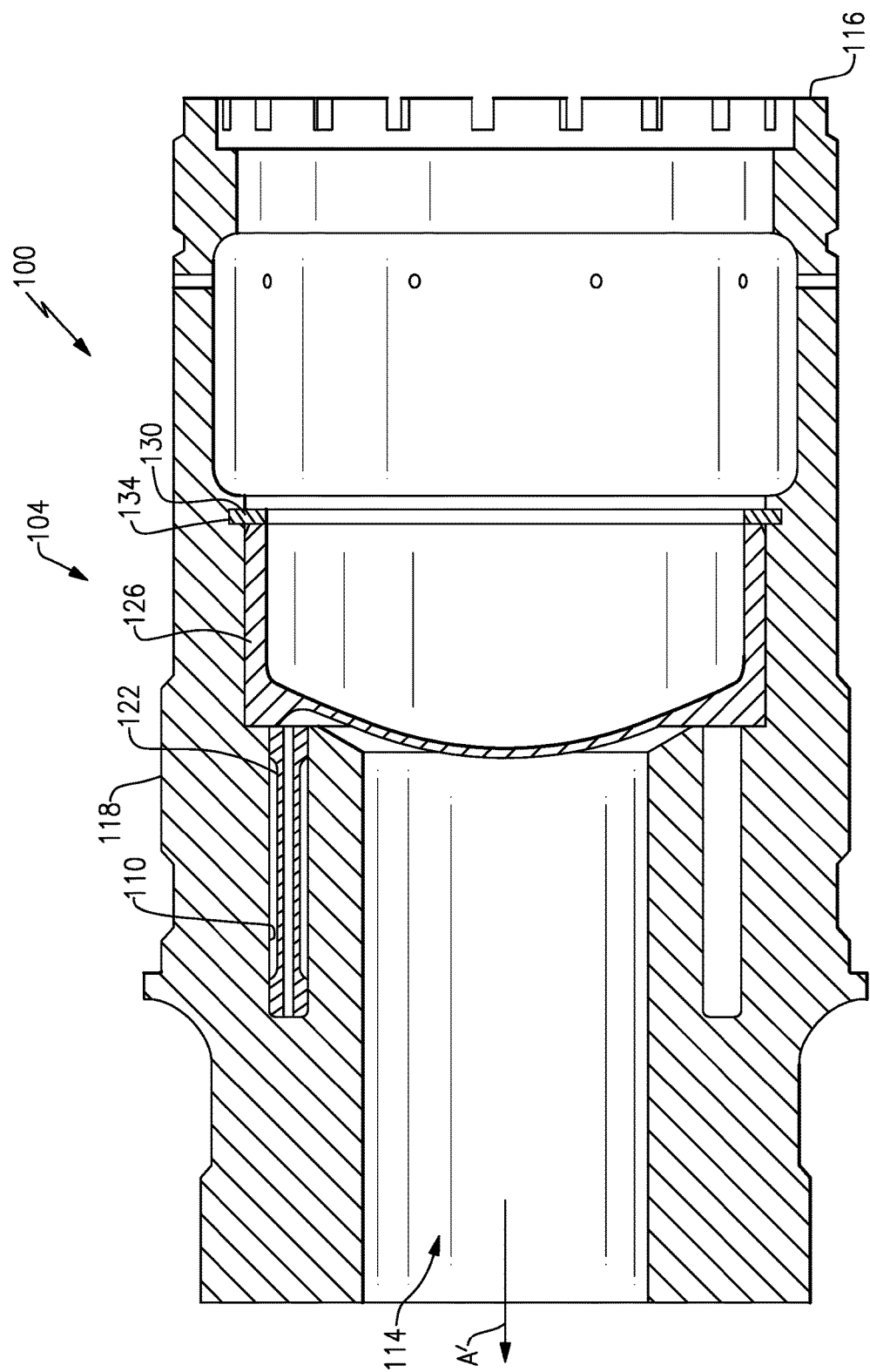
FIG. 3 illustrates a section view of an aft end portion of a shaft of the engine of FIG. 2.
Figure 4:
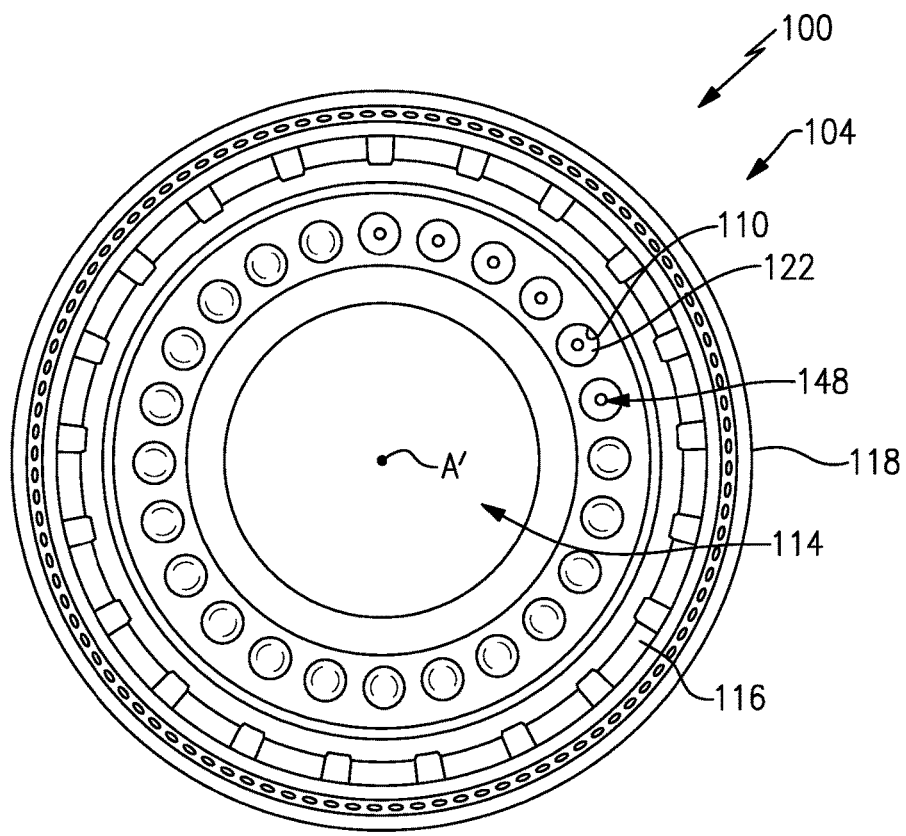
FIG. 4 illustrates an end view of the shaft of FIG. 3 with a shaft cover removed.

Referring now to FIG. 2, an example industrial gas turbine engine assembly 72 includes a gas turbine engine 74 that is mounted to a structural land-based frame to drive a generator 76. The example gas turbine engine 74 includes many of the same features described in the gas turbine engine 20 illustrated in FIG. 1 and operates in much the same way. The land-based industrial gas turbine engine 74, however, may include additional features such as a shaft to drive the generator 76 and is not constrained by the same weight restrictions that apply to an aircraft mounted gas turbine engine 20. In addition, the example gas turbine engine 74 does not include a fan.

As appreciated, there are many similarities between the components utilized in aircraft and land-based gas turbine engine. Both aircraft-based and land-based gas turbine engines are within the contemplation of this disclosure.

Referring now to FIGS. 3 to 6 with continued reference to FIG. 2, a shaft 100 of the industrial gas turbine engine 74 is utilized to balance the engine 74. The example shaft 100 is part of the low spool of the engine 74.

The balancing may take place immediately after assembly of the engine 74, or during a service interval. The balancing is trim balancing in this example. That is, the balancing of the shaft 100 balances the engine 74 overall.

Engine balancing, in this example, includes three distinct phases: detail balancing, assembly balancing, and engine balancing. The detail balancing phase involves balancing an individual rotatable component about its axis of rotation relative to itself. After the individual rotatable component is assembled with other balanced parts into a large sub-assembly of the engine 20, that sub-assembly is balanced about its axis of rotation during an assembly balancing phase (or module balancing phase). The sub-assembly is then combined with other sub-assemblies to provide the engine 20. The engine 20 is then balanced during the engine balancing phase. During all the balancing phases, balancing may require removing mass, adding mass, or rearranging mass.

An aft portion 104 of the shaft 100 defines a plurality of cavities 110 circumferentially distributed about an axis A' of rotation for the shaft 100. A central bore 114 extends through shaft 100 to an end face 116 of the shaft 100. The example cavities 110 are positioned radially between the bore 114 and an outer surface 118 of the shaft 100.

The cavities 110 are in the aft portion 104 in this example. In other example, the cavities 110 are defined in a forward portion of the shaft 100.

The cavities 110 each can selectively receive one of a plurality of balancing inserts 122. In another example, the cavities 110 each can selectively receive more than one of the balancing inserts 122. A cover 126 and a snap ring 130 hold the balance inserts 122 within the cavities 110.

The snap ring 130 is received within a groove 134 to hold an axial position of the cover 126, which interfaces directly with the balancing inserts 122. Retaining hardware other than the cover 126 and snap ring 130 may be used to capture or hold the balance inserts 122 in other examples.

The balancing inserts 122 rotatably balance the shaft 100. As can be appreciated, redistributing balancing inserts 122 among the cavities 110 are counterweights that alter the distribution of weight throughout the shaft 100. The balancing inserts 122 can be selectively added and removed from the cavities 110 until the shaft 100 and the low spool of the engine 74 are rotatably balanced.

The balancing inserts 122 are selected from among a plurality of balancing inserts. Some of the balancing inserts 122 within the plurality are heavier than others of the balancing inserts 122. The distribution of weight throughout the shaft 100 can thus also be varied by selecting a heavier or lighter balancing insert 122 for insertion within the cavities 110. In some examples, the balancing inserts 122 all weigh less than a few ounces (or 50 or so grams).

The example balancing inserts 122 are cylindrical. A midsection area of the inserts 122 is reduced relative to a diameter of the inserts 122 at the ends, such that the inserts 122 have a dog-bone type configuration. The variations in the weights of the balancing inserts 122 is accomplished, in one example, by removing different amounts of material from the balancing inserts 122 to vary the diameter of the midsection and create different sized notches N. More material is removed, and a larger notch N created, if a lighter weight is desired.

The example balancing inserts 122 are steel, but other materials may be used in other examples. Variations in material could also be relied on to provide the variations in weights within the plurality of the balancing inserts 122.

To assist in withdrawing the example balancing inserts 122 from the cavities 110, ends of the balancing inserts 122 may include an at least partially threaded aperture 148 to receive a threaded fastener (not shown). After the threaded fastener engages the threaded aperture 148, one of the balancing inserts 122 can be more easily withdrawn from a respective one of the cavities 110. The aperture 148 can extend through the axial length of the inserts 122. In this example, only the axial end portions of the aperture 148 are threaded.

The array of circumferentially distributed cavities 110 and ability to select from inserts 122 of different weights provides multiple options for balancing the example shaft 100. Withdrawing and inserting various combinations of balancing inserts 122 with various ones of the cavities may be required. Balancing is often an iterative process, and several variations may be attempted before providing a suitable combination of balancing inserts 122 and the specific cavities 110 receiving balancing inserts 122. In some example, the cavities 110 may be able to receive multiple inserts 122, and additional inserts 122 are added to a single one of the cavities 110 if more weight is desired in a particular area.

Since the balancing inserts 122 within selected ones of the cavities 110 provides the balancing, the cavities 110 are consider the balancing positions for the shaft 100. The cavities 110 that receive the balancing inserts 122 are spaced radially about 3 inches (76 millimeters) from the axis A'. The diameter of the low spool associated with the shaft 100 may be from 20 to 30 inches (0.508 to 0.762 meters). The low rotor is thus balanced at a balancing positions that are radially spaced a distance from an axis of rotation that is less than 20% a total diameter of the associated spool.

The balancing positions are also radially inside an outermost surface 118 of the shaft 100. Balancing is thus confined radially within the shaft 100.

The balancing inserts 122 can be selectively inserted and withdrawn from the cavities 110 from the end face 116 of the bore, provided the cover 126 and the snap ring 130 are removed. To access the end face 116 of the shaft 100, removing panels may be required. However, the disclosed method of trim balancing a shaft 100 may not without require access to the disk.

Figure 5:
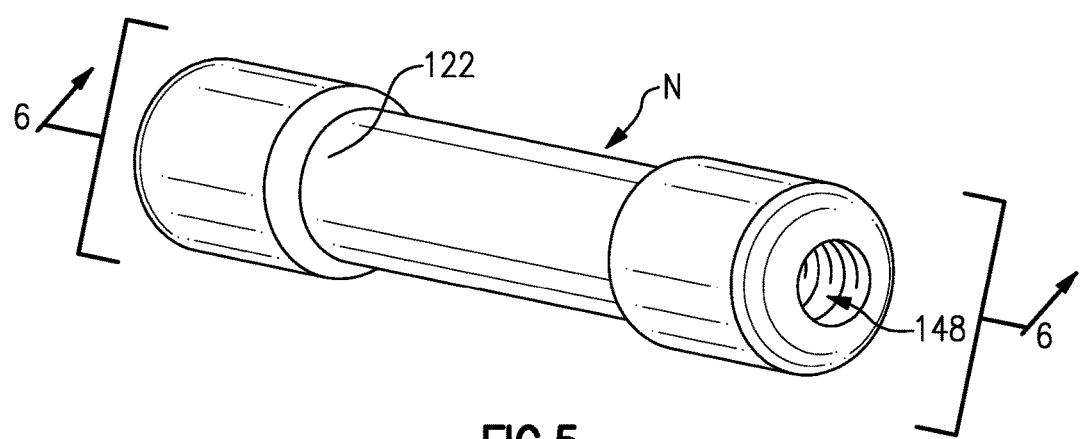
FIG. 5 illustrates an example balancing insert from the shaft of FIG. 3.
Figure 6:
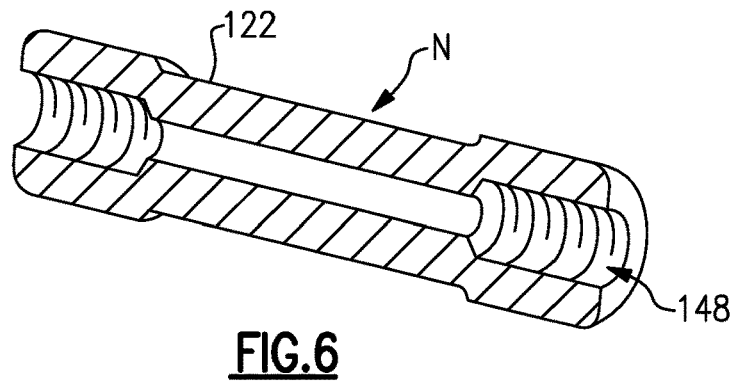
FIG. 6 illustrates a section view at line 6-6 in FIG. 3
Figure 7:
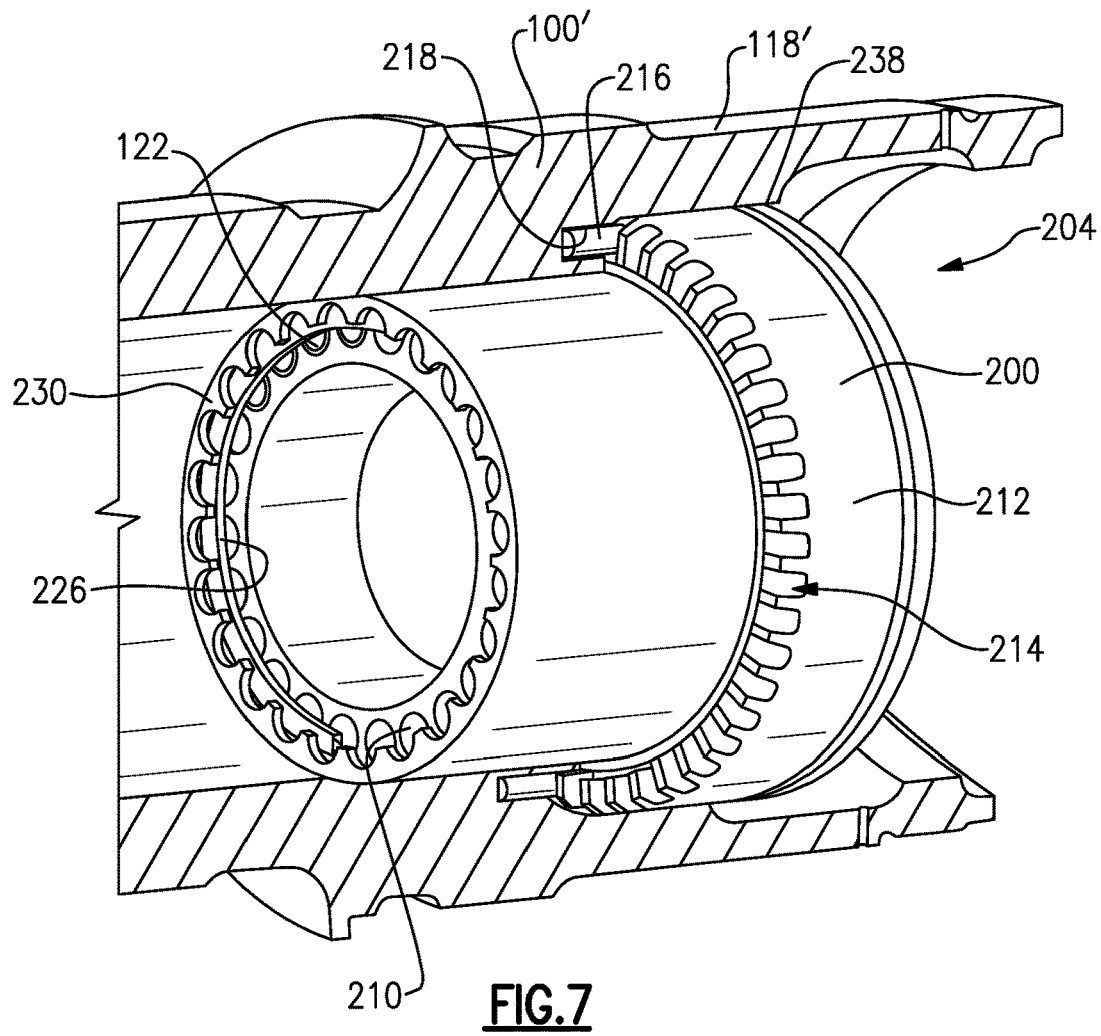
FIG. 7 shows a partial section view of an aft end of another example shaft embodiment of the engine of FIG. 2.
Figure 8:
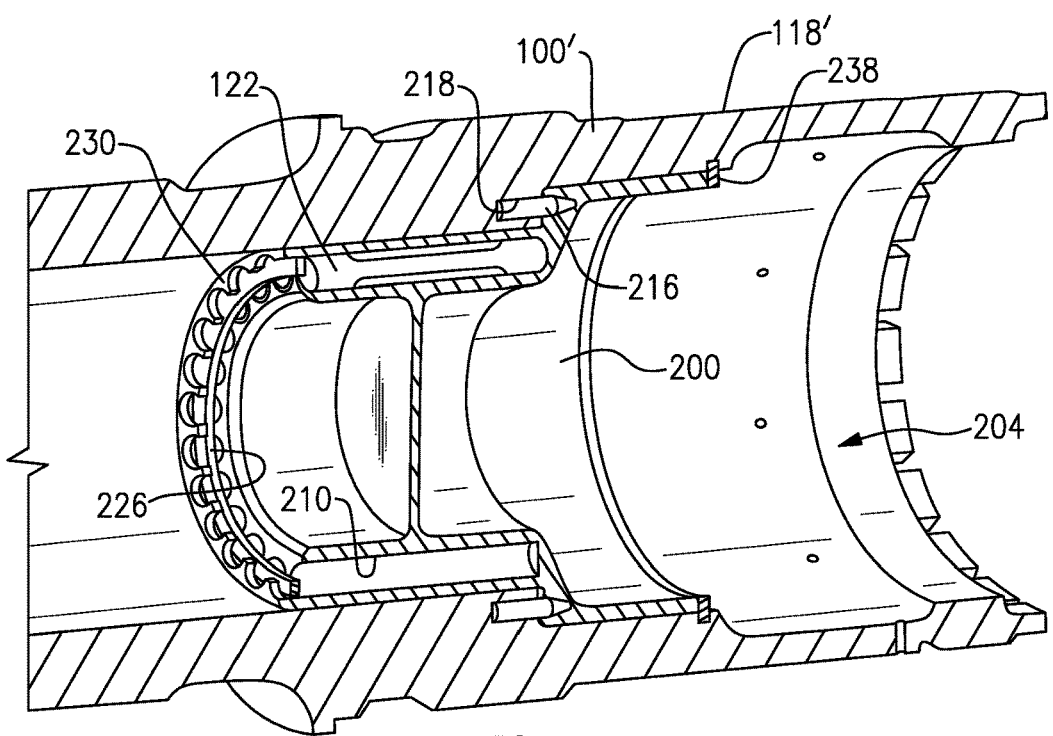
FIG. 8 shows a full section view of FIG. 7.
Figure 9:
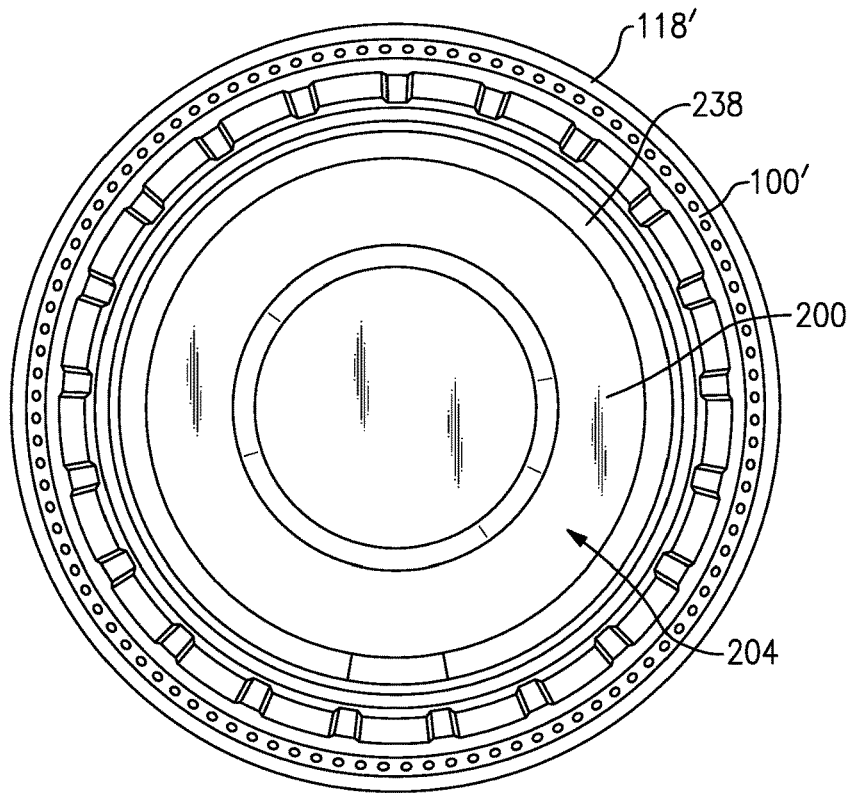
FIG. 9 shows an end view of the shaft of FIG. 7.

Referring now to FIGS. 7 to 9 with continuing reference to FIGS. 5 and 6, in another example embodiment, a balancing cartridge 200 is received within a bore 204 of a shaft 100'. The cartridge 200 provides an oil over plate function in some examples.

The cartridge 200 provides a plurality of cavities 210 circumferentially distributed about an axis of rotation A" for the shaft 100'. The cavities are positioned radially inside an outer surface 118' of the shaft 100'.

The example cartridge 200 includes a radially enlarged collar 212. Scallops 214 are cut into the collar 212. The scallops 214 are each configured to receive an antirotation pin 216 extending from apertures 218 in the shaft 100'. The antirotation pin 216 is tapered in this example to facilitate insertion into one of the scallops 214. Two antirotation pins 216 are used in this example, but other numbers could be used.

When the antirotation pin 216 is received within one of the scallops 214, rotation of the cartridge 200 relative to the shaft 100' is blocked. The scallops 214 help to increase balance vector resolutions by ensuring the cartridge 200 is installed at the desired angular orientation.

During balancing, balance inserts 122 are selectively positioned within the cavities 210 prior to installing the cartridge 200 within the bore 204. A retaining ring 226 holds the balance inserts 122 within the cavities 210. The retaining ring 226 fits within a flange 230 defined by the cartridge 200.

The cartridge 200 is then secured within the bore 204. Another retaining ring 238 holds the cartridge 200 within the bore 204. The engine 74 may then be operated to determine if the desired balancing has been achieved. If not, the cartridge 200 is withdrawn from the bore 204 and new combinations of inserts 122 are placed in the cavities 210.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method of balancing a turbine engine shaft, comprising:
    inserting a balancing insert into one of a plurality of cavities, the plurality of cavities radially inside an outermost surface of a shaft, the balancing insert configured to rotatably balance the shaft; and
    accessing the plurality of cavities through an aftmost end of the shaft, the shaft a turbine engine shaft.

2. The method of claim 1, further comprising trim balancing a low rotor of a gas turbine engine during the balancing of the shaft.

3. The method of claim 2, wherein the gas turbine engine is a land-based gas turbine engine.

4. The method of claim 1, wherein the plurality of cavities are radially outside a central bore of the shaft.

5. The method of claim 1, further comprising selecting the balancing insert from among a plurality of balancing inserts having varied weights.

6. The method of claim 1, further comprising holding the balancing insert axially within one cavity of the plurality of cavities using a shaft bore cover.

7. The method of claim 6, further comprising holding the shaft bore cover axially utilizing a trim ring received within a circumferential groove of the shaft.

8. The method of claim 1, wherein the plurality of cavities are provided within the shaft.

9. The method of claim 1, further comprising inserting a cartridge into a bore provided by the shaft, the cartridge providing the plurality of cavities.

10. A gas turbine rotor, comprising:
a balancing insert; and
a shaft of a turbine engine, wherein a plurality of cavities to selectively receive the balancing insert are positioned radially inside an outermost surface of the shaft, wherein the plurality of cavities are radially outside a central bore of the shaft, the balancing insert configured to rotatably balance the shaft; and wherein the plurality of cavities are accessible through an aftmost end of the shaft.

11. The rotor of claim 10, wherein the shaft is a low rotor shaft of a gas turbine engine.

12. The rotor of claim 11, wherein the gas turbine engine is a land-based gas turbine engine.

13. The rotor of claim 10, wherein the balancing insert is one of a plurality of balancing inserts having varied weights.

14. The rotor of claim 10, further comprising a shaft bore cover holding the balancing insert axially within one cavity of the plurality of cavities.

15. The rotor of claim 10, wherein the plurality of cavities are distributed annularly about an axis of the shaft.

16. The rotor of claim 14, further comprising a trim ring received within a circumferential groove of the shaft to hold the shaft bore cover axially.

17. The rotor of claim 10, further comprising a cartridge providing the plurality of cavities, the cartridge insertable into the central bore provided by the shaft.

18. The rotor of claim 10, wherein the plurality of cavities each have an aft end that is axially spaced a distance from an aftmost end face of the shaft.

19. The rotor of claim 10, wherein the balancing insert includes an at least partially threaded aperture.

20. A gas turbine rotor, comprising:
a balancing insert; and
a shaft of a turbine engine, wherein a plurality of cavities to selectively receive the balancing insert are positioned radially inside an outermost surface of the shaft, wherein the plurality of cavities are accessible through an aftmost end of the shaft, the balancing insert configured to rotatably balance the shaft.

* * * * *